(No Model.)

C. D. AUMOCK.
FORCE FEED FERTILIZER DISTRIBUTER.

No. 270,198. Patented Jan. 9, 1883.

Witnesses:
Phil C. Dietrich
J. R. Littell

Inventor:
C. D. Aumock,
by C. A. Snow & Co.
Attorneys.

UNITED STATES PATENT OFFICE.

CHARLES D. AUMOCK, OF OWASCO LAKE, NEW YORK.

FORCE-FEED FERTILIZER-DISTRIBUTER.

SPECIFICATION forming part of Letters Patent No. 270,198, dated January 9, 1883.

Application filed August 31, 1882. (No model.)

*To all whom it may concern:*

Be it known that I, CHARLES D. AUMOCK, of Owasco Lake, in the county of Cayuga and State of New York, have invented certain new and useful Improvements in Force-Feed Fertilizer Distributers; and I do hereby declare that the following is a full, clear, and exact description of the invention, which will enable others skilled in the art to which it appertains to make and use the same, reference being had to the accompanying drawings, which form a part of this specification.

This invention relates to force-feed fertilizer-distributers, and has for its object to provide simple and efficient means for readily and conveniently regulating the amount of fertilizer sown.

Figure 1:
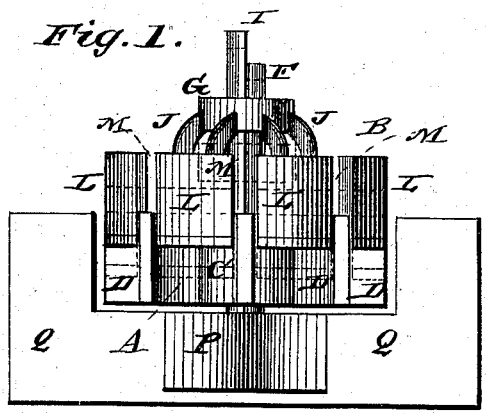
Figure 4:
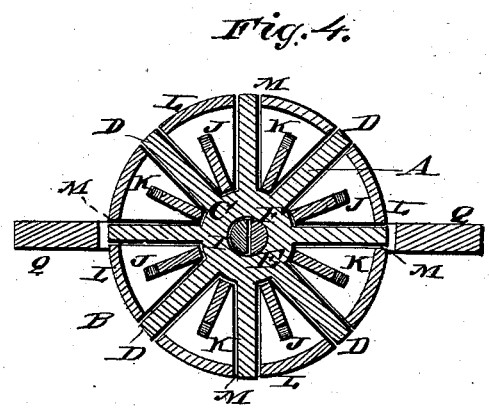
Figure 2:
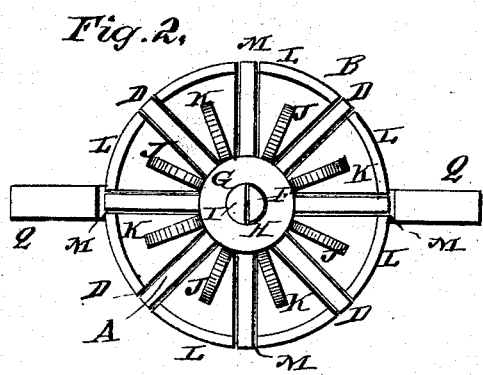
Figure 5:
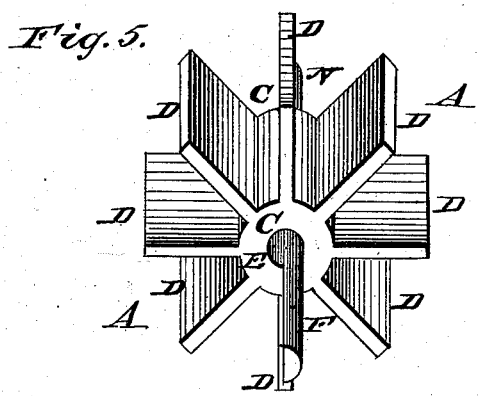
Figure 3:
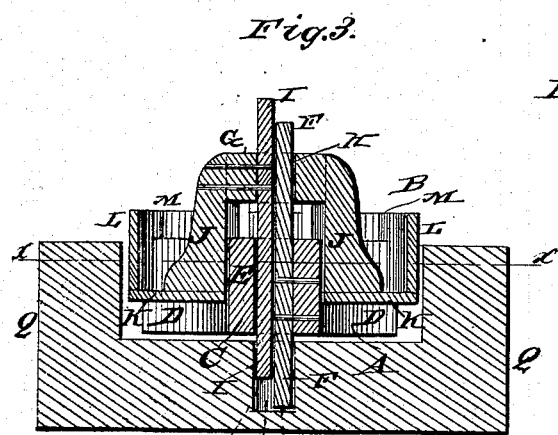
Figure 6:
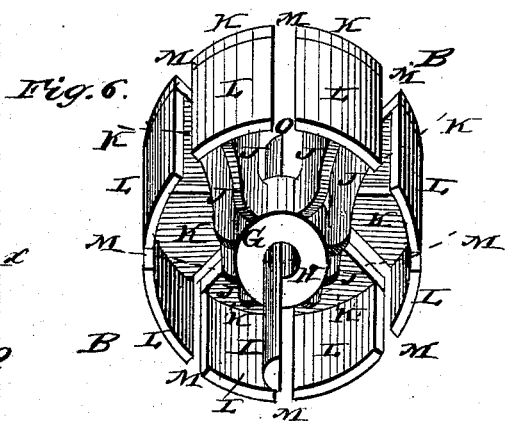

In the drawings, Figure 1 is a top view of my invention. Fig. 2 is a side view thereof. Fig. 3 is a horizontal sectional view. Fig. 4 is a vertical sectional view on the line $x\,x$, Fig. 3. Fig. 5 is a detail perspective view of the fan-wheel. Fig. 6 is a like view of the regulating-wheel.

Referring to the drawings, A designates the fan-wheel, and B the regulating-wheel. The former consists of a hub, C, having radial transverse beaters D and a cylindrical central opening or bearing, E, in which is secured a semicircular shaft, F. Regulating-wheel B has likewise a hub, G, formed with a cylindrical central bearing, H, for a fixed corresponding semicircular shaft, I, secured therein. Shafts F and I, though entirely independent of each other, when adjusted together form a complete cylindrical shaft, and the shaft I is slid into the semicircular space in hub C, while the shaft F enters the like space in hub G. The bearings of the hubs are thus filled, and the two wheels A and B revolve together as if on the same circular shaft, a rotary motion being imparted to shafts F and I by suitable mechanism. The hub G of wheel B is provided with a circumferential series of lateral arms, J, each of which carries at its outer end a substantially Y-shaped or triangular plate, K, having at its outer edge a segmental plate, L, extending over the arm J. Between each plate K is thus formed an opening or slot, M, which, when the shafts are adjusted together, is entered by wings or beaters D, while the plates K fill up the corresponding space between the latter. The ends N O respectively of shafts F and I are journaled in bearings P in a support, Q, with the fan-wheel underneath.

The operation and advantages of my invention will be readily understood. By adjusting the regulating-wheel B, with its shaft I, toward the support Q the movement of neither of the fans or shafts is interfered with, and the face of the wings D is reduced as desired, (see dotted lines, Fig. 1 of the drawings,) causing a corresponding reduction in the amount of material distributed. By an opposite adjustment of wheel B and its semicircular shaft the face of the wings or beaters D is extended to increase the distribution. In this manner the "dips" of the fan-wheel are made deep or shallow.

If the fan-wheel should become clogged or choked with the fertilizer, or should the latter adhere to the wheel, it can be readily forced off by adjusting the regulating-wheel B down to its entire extent.

My invention is very simple, and by it the amount of fertilizer distributed is readily and easily controlled and with accuracy. At the same time great scope or variation in amount distributed is imparted to the fan-wheel.

I claim as new—

1. The combination, with a support, Q, having cylindrical bearings P, of the fan-wheel A, having a central cylindrical bearing, E, in which is secured a semicircular shaft, F, and a regulating-wheel, B, having corresponding bearing, H, in which is secured a semicircular shaft, I, as set forth.

2. The combination, with the fan-wheel A, comprising hub C, radial transverse wings or beaters D, cylindrical bearing E, and semicircular shaft F, of the regulating-wheel B, comprising hub G, cylindrical bearing H, semicircular shaft I, circumferential lateral arms J, substantially triangular plates K, and overhanging segmental plates L, as set forth.

In testimony that I claim the foregoing as my own I have hereunto affixed my signature in presence of two witnesses.

CHARLES D. AUMOCK.

Witnesses:
HENRY H. BOSTWICK,
ORIN McCARTY.